(12) United States Patent
Shankar et al.

(10) Patent No.: US 9,223,629 B2
(45) Date of Patent: Dec. 29, 2015

(54) DATA PROCESSING SYSTEM AND METHOD

(75) Inventors: Ganesh Handige Shankar, Bangalore Karnataka (IN); Padmanabhan Selvakumarapalayam Nagarajan, Cupertino (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1464 days.

(21) Appl. No.: 12/021,971

(22) Filed: Jan. 29, 2008

(65) Prior Publication Data
US 2008/0184244 A1 Jul. 31, 2008

(30) Foreign Application Priority Data
Jan. 31, 2007 (IN) .............................. 207/CHE/2007

(51) Int. Cl.
*G06F 9/46* (2006.01)
*G06F 9/50* (2006.01)

(52) U.S. Cl.
CPC ..................... *G06F 9/505* (2013.01)

(58) Field of Classification Search
None
See application file for complete search history.

(56) References Cited

U.S. PATENT DOCUMENTS

| | | | |
|---|---|---|---|
| 6,658,654 B1* | 12/2003 | Berry et al. .................. | 717/131 |
| 7,093,258 B1* | 8/2006 | Miller et al. .................. | 718/105 |
| 2003/0236816 A1* | 12/2003 | Venkatasubramanian .... | 709/107 |
| 2005/0081183 A1* | 4/2005 | Accapadi et al. ............. | 717/100 |
| 2005/0086660 A1* | 4/2005 | Accapadi et al. ............. | 718/107 |
| 2005/0149929 A1* | 7/2005 | Srinivasan et al. ............ | 718/100 |
| 2006/0037017 A1* | 2/2006 | Accapadi et al. ............. | 718/100 |
| 2007/0067606 A1* | 3/2007 | Lin et al. ........................ | 712/10 |
| 2007/0097979 A1* | 5/2007 | V. et al. ......................... | 370/392 |

* cited by examiner

*Primary Examiner* — Dong Kim
(74) *Attorney, Agent, or Firm* — HGF Limited

(57) ABSTRACT

A method of optimizing an application in a system having a plurality of processors, the method comprising: analyzing the application for a first period to obtain a first activity analysis; selecting one of the processors based on the activity analysis for running the application; and binding the application to the selected processor.

13 Claims, 3 Drawing Sheets

DATA PROCESSING SYSTEM AND METHOD

RELATED APPLICATIONS

This patent application claims priority to Indian patent application serial no. 207/CHE/2007, titled "Data Processing System and Method", filed in India on 31 Jan. 2007, commonly assigned herewith, and hereby incorporated by reference.

BACKGROUND TO THE INVENTION

In a data processing system with multiple processors, an operating system will schedule a thread to execute on a processor that becomes free for executing a thread.

A thread of a program running on the system can be bound to a selected processor. The thread will only be executed by the selected processor. For example, the operating system will only schedule the thread to be executed by the selected processor.

Enterprise servers, such as, for example, web servers or database servers, often contain multiple processors.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

Figure 1:
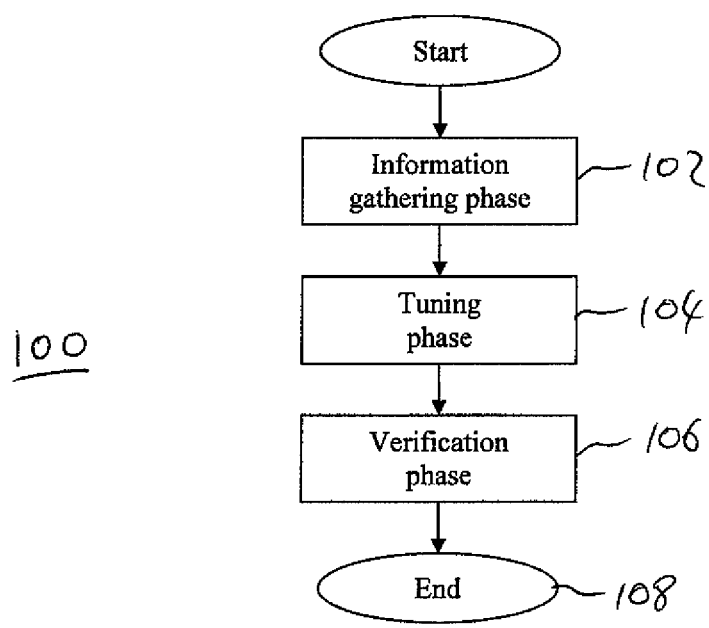
FIG. 1 shows an embodiment of a method of optimizing an application.

Embodiments of the invention can be used to automatically optimize an application (that is, a thread or a process) on a data processing system having a plurality of processors or cells.

In a system with a plurality of processors (logical and/or physical processors), an application may run more efficiently on certain processors. For example, on certain processors, more instructions of an application may be executed in a given time period and/or the application may complete its tasks more quickly. The efficiency of an application when executing on a processor can be affected by a number of factors. For example, in a system with cache-coherent non-uniform memory access (ccNUMA) architecture, the location of an application's data in memory can affect the efficiency of the thread on the various processors of the system. In such architectures (for example, cell-based architectures), each processor is associated with its own area of memory. An application will communicate faster with memory associated with the processor on which it is running (i.e. memory within the cell), than with memory associated with other cells.

Also, in certain systems, a system component, such as a network interface card (NIC), may be configured to interrupt a predetermined processor when it receives a data packet, and an application that processes the data packet may run more efficiently on the predetermined processor than on other processors.

Embodiments of the invention recognise that an application will execute more efficiently on a certain processor. The application may be a user application, or an application that is part of the operating system on a data processing system, or some other application. An application executing more efficiently may have a higher throughput and/or may conclude more quickly. Embodiments of the invention may therefore analyze the system and the application to determine a processor that would execute the application efficiently, and may then bind the application to that processor. For example, embodiments of the invention determine which system components the application interacts with, and/or which areas of memory the application interacts with, and binds the application to a selected processor accordingly. For example, where an application interacts with a particular NIC, or interacts with a particular NIC more than any other NIC, then embodiments of the invention may bind the application to a processor that is configured to be interrupted by the particular NIC. Where an application interacts with a particular area of memory in a cell-based architecture, or interacts more with a particular area of memory than other areas of memory, then embodiments of the invention may bind the application to the processor associated with the particular area of memory.

Embodiments of the invention may improve a number of types of applications. For example, purchasing from an online shopping web site is handled by a data processing system. The data processing system may include one or more applications that handle transactions for buying products. Embodiments of the invention can be used to improve the performance of the applications so that, for example, transactions are processed and completed more quickly by the data processing system, the data processing system may be able to handle more transactions simultaneously, and/or the applications may be executed on a data processing system of reduced capabilities (and therefore reduced cost) with little or no reduction in performance.

FIG. 1 shows a method 100 of optimizing an application according to embodiments of the invention. The method starts at step 102, which is the information gathering phase. In this phase, information is gathered on the configuration of the data processing system and the activity of the application to be optimized. The next step is step 104, the tuning phase, where the application will be tuned on the data processing system. For example, the application will be bound to a processor that is associated with a system component and/or an area of memory with which the application has interacted in the information gathering phase 102. The method 100 continues from step 104 to step 106, the verification phase, where the performance of the application before and after the tuning phase 104 is compared, and one or more changes will be undone if necessary if the performance of the application has degraded.

Figure 2:
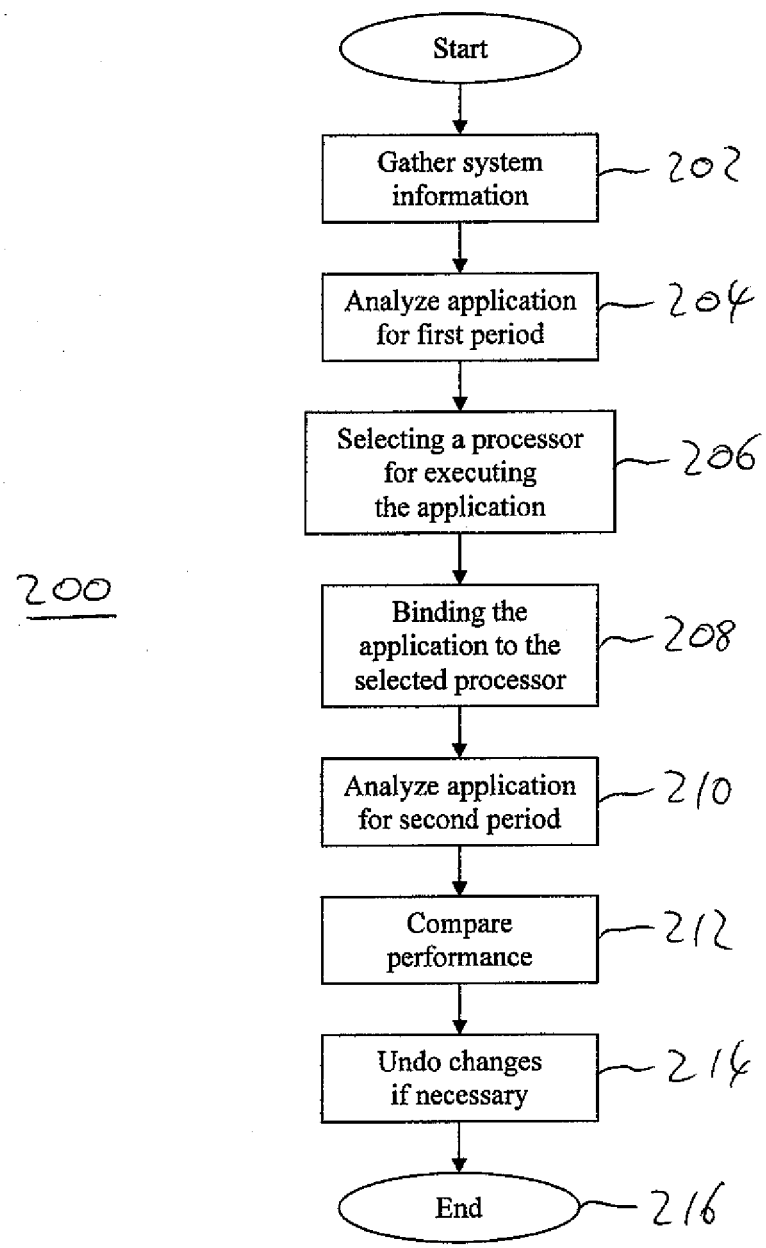
FIG. 2 shows an embodiment of a method of optimizing an application in more detail.

FIG. 2 shows a method 200 of optimizing an application in more detail. The information gathering phase 102 of the method 100 of FIG. 1 comprises a step 202 of gathering system information, followed by a step 204 of analyzing the application executing on the data processing system for a first period. The application may be an application that was running before the method 200 of optimizing the application started, or an application that was not running before the method started but was started before the step 204 of analyzing the application for a first period.

The step 202 of gathering system information comprises obtaining information on which processors and/or cells are present in the data processing system, which system components (such as, for example, NICs) are present in the data processing system, and which processors are interrupted by the system components.

The step 204 of analyzing the application for a first period comprises obtaining a first activity analysis of the application and obtaining a first performance analysis of the application. Obtaining a first activity analysis of the application comprises analyzing the application's interactions with any system components and, in a ccNUMA or cell-based architecture, analyzing the applications interactions with areas of memory. The first activity analysis may also include the utilization of each processor in the data processing system by all applications utilizing the processors. Obtaining a first performance analysis of the application comprises analyzing the application's utilization percentage of the processor on which it is executing over the first period, and/or obtaining a cycles-per-instruction (CPI) value for the application over the second period.

Once the first period is over, the method moves from step 204 to the tuning phase. The tuning phase comprises a step 206 of selecting a processor for executing the application, and a step 208 of binding the application to the processor selected in step 206.

In step 206, a processor is selected for running the application, based on the first activity analysis. This may be based on one or more of a number of factors. The activity analysis may reveal that the application processes packets from one or more system components. The activity analysis may additionally or alternatively reveal that the application interacts with one or more areas of memory, where each area of memory is associated with a particular processor in a cell-based architecture.

In certain embodiments, where the application processes packets from one or more system components, then the selected processor may be a processor that is interrupted by one of the system components. For example, if the application processes a large number of packets from a system, such as a number of packets above a threshold amount, then the selected processor will be the processor that is interrupted by that system component. If the application processes a large number of packets from a number of system components, then the system component providing the largest number of components may be considered, and the processor that is interrupted by that component selected.

If a processor is not selected as above, then a processor may be selected based on the applications interaction with memory, where the data processor system comprises a cell-based architecture. For example, where the application interacts with a memory area associated with a processor, then that processor will be selected. Where the application interacts with multiple areas of memory associated with respective processors, then a processor will be selected that will provide the application with the greatest performance enhancement. For example, the application may have interacted with the area of memory associated with the selected processor the greatest number of times during the first period, or the area of memory associated with the selected processor may have provided the application with the greatest proportion of memory used by the application.

In alternative embodiments, a processor may be selected based on memory usage before interaction with system components.

A processor may also be selected based on the first performance analysis obtained during the first period. For example, a processor may not be selected where the utilisation of the processor by all applications exceeded a threshold level.

Once a processor has been selected in step 206, the method 200 advances to step 208 where the application is bound to the selected processor. This causes the operating system to schedule the application to execute on the selected processor during subsequent execution. As a result, the application will only be executed by the selected processor, and the application may subsequently be executed more efficiently by the selected processor, and hence by the data processing system. If the selected processor is the processor which was executing the application before the binding in step 208, then the application may still be bound to that processor, as this may prevent or reduce the chance of the operating system subsequently scheduling the application on a different processor.

Once the application has been bound to the selected processor in step 208, the method 200 advances to the verification phase, comprising a step 210 of analyzing the application executing on the data processing system for a second period, a step 212 of comparing the performance of the application in step 210 with that in step 204, and a step 214 of undoing the changes (i.e. the binding of the application to the selected processor) if necessary.

In step 210, the performance of the application is analyzed for a second period to obtain a second performance analysis. Obtaining a second performance analysis of the application comprises analyzing the applications utilization percentage of the processor on which it is executing over the second period, and/or obtaining a cycles-per-instruction (CPI) value for the application over the second period. Before the first period begins, embodiments of the invention may wait for a predetermined settling time to allow the selected processor to perform any initializations that occur when the application is first executed on the selected processor, such as population of the processor's cache due to memory accesses by the application, as the application may run inefficiently during this time.

Once the second performance analysis has been obtained in step 210, the method 200 advances to step 212 where the first performance analysis, obtained in step 204, is compared with the second performance analysis, to determine if the performance of the system has degraded, for example if the application is running less efficiently on the second processor than its original processor. If this is the case, then, in step 214 of the method 200, the binding of the application to the processor selected in step 206 is removed. The application may then be bound to the processor that was executing the application before the start of the method 200. From step 214, the method 200 ends at step 216.

The effective cycles per instruction (CPI) value of an application can be calculated over a period of time using the following formula:

$$CPI = \frac{\text{total clock cycles}}{\text{Instructions retired} - \text{NOPs retired}}$$

A higher CPI value indicates that a processor requires more clock cycles for executing each instruction. Therefore, where all of the relevant processors of the data processing system have the same or similar clock frequency, a higher CPI value indicates less efficient execution of the application.

Embodiments of the invention may omit the verification phase if it is assumed that the application will execute more efficiently on the selected processor, and/or the overall data processing system will run more efficiently.

Embodiments of the invention may optimize a number of applications running on a data processing system, and not just a single application. For example, embodiments of the invention may carry out the method 200 of optimizing an application on each application to be optimized in turn.

Embodiments of the invention may be implemented on a number of operating systems. For example, embodiments of the invention can be implemented on the HP-UX operating system. In this case, certain system calls may be used to gather information about the data processing system and/or any applications running on it. For example, a list of processors in the data processing system and, with cell-based architectures, may be obtained using the pstat( ) and/or mpctl( ) system calls, information on system components (such as NICs) can be obtained using the dlpi( ) and ioctl( ) system calls, and the mpctl( ) system call can be used to bind applications to certain processors. Other operating systems may provide similar system calls or other facilities to obtain the information.

Embodiments of the invention may be used to optimize multiple applications on a data processing system. During the first period, the data processor utilization of all applications on the data processing system is measured, and the applications with the highest data processor utilization are selected. For example, the ten applications with the highest utilization are selected or applications with a utilization above a threshold value are selected. Alternatively, a list of selected applications is provided.

After the analysis period, a data processor preference list is created for each selected application. The preference list is ordered based on the performance benefit expected on each data processor. For example, where an application communicates a large amount with a NIC that interrupts a first data processor and a small amount with a NIC that interrupts a second data processor, then the first data processor may appear top of the preference list, followed by the second data processor, followed by, for example, a third data processor.

Each selected application is bound to the data processor at the top of the preference list for that application. If this is not possible, for example if the utilization on the data processor was above a threshold value during the first period, then the next data processor in the preference list is chosen, and so on until the application is bound to a data processor.

Embodiments of the invention may periodically optimize one or more applications.

Figure 3:
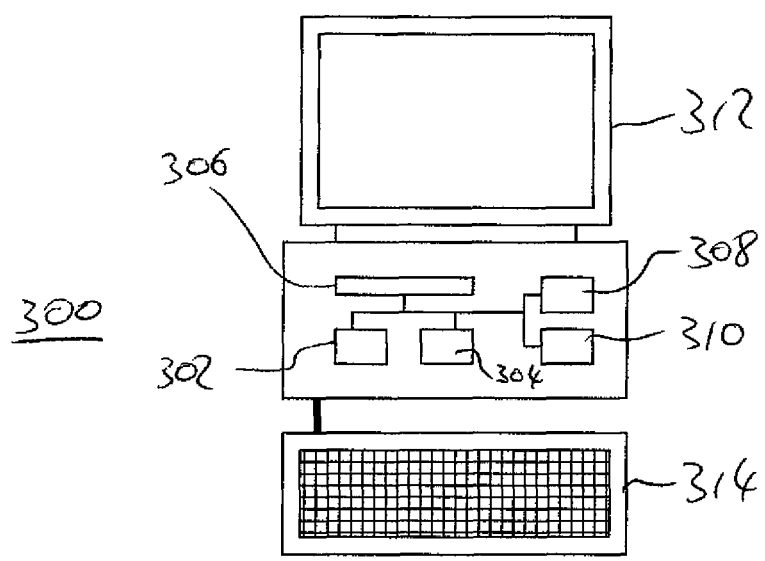
FIG. 3 shows an example of a data processing system suitable for implementing embodiments of the invention.

FIG. 3 shows an example of a data processing system 300 suitable for implementing embodiments of the invention. The system 300 comprises a first processor 302 and a second processor 304, although alternative systems may include more than two processors. The system 300 includes memory 306. The system 300 may also include a permanent storage device 308, such as a hard disk, and/or a communications device 310 for communicating with a wired and/or wireless network, such as a LAN, WAN, internet or other network. The system 300 may also include a display device and/or an input device, such as, for example, a mouse and/or keyboard.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of optimizing an application in a system having a plurality of processors, the method comprising:
   analyzing the application for a first period to obtain a first application activity analysis;
   identifying, based on the application activity analysis, one of the plurality of processors as being able to execute the application more efficiently than other processors in the plurality of processors;
   wherein the identifying one of the plurality of processors comprises determining a network component which the application interacts with the most during the first period, and identifying the one of the plurality of processors as being configured to be interrupted by the network component;
   in response to the identifying, selecting the identified processor for running the application; and
   binding the application to the identified processor.

2. A method as claimed in claim 1, wherein identifying one of the processors comprises determining an area of memory used by the application, and identifying a processor associated with the area of memory.

3. A method as claimed in claim 2, wherein each processor is associated with a respective area of memory, and determining an area of memory comprises determining an area of memory which the application interacts with the most.

4. A method as claimed in claim 1, wherein analyzing the application for the first period comprises determining utilization by the application of each processor during the first period.

5. A method as claimed in claim 4, wherein identifying one of the processors comprises identifying a processor with a utilization below a threshold value.

6. A method as claimed in claim 1, wherein analyzing the application for the first period comprises measuring the performance of the application to obtain a first performance analysis, and the method further comprises:
   analyzing the application for a second period after binding the application to the selected processor to obtain a second performance analysis;
   comparing the first performance analysis with the second performance analysis; and undoing the binding such that the application is executed by the processor that executed the application before the binding if the comparison shows the performance has degraded.

7. A computer product comprising non-transitory computer-readable storage media encoded with a program for optimizing an application in a system having a plurality of processors, the computer program comprising:
    code for analyzing the application for a first period to obtain a first application activity analysis;
    code for identifying, based on the application activity analysis, one of the plurality of processors as being able to execute the application more efficiently than other processors in the plurality of processors;
    wherein the code for identifying one of the plurality of processors comprises code for determining a network component which the application interacts with the most during the first period, and code for identifying a processor configured to be interrupted by the network component;
    code for selecting the identified processor for running the application; and
    code for binding the application to the identified processor.

8. A computer product as claimed in claim 7, wherein the code for identifying one of the processors comprises code for determining an area of memory used by the application, and code for identifying a processor associated with the area of memory.

9. A computer product as claimed in claim 8, wherein each processor is associated with a respective area of memory, and the code for determining an area of memory comprises code for determining an area of memory which the application interacts with the most.

10. A computer product as claimed in claim 7, wherein the code for analyzing the application for the first period comprises code for determining utilization by the application of each processor during the first period.

11. A computer product as claimed in claim 10, wherein the code for identifying one of the processors comprises code for identifying a processor with a utilization below a threshold value.

12. A computer product as claimed in claim 7, wherein the code for analyzing the application for the first period comprises measuring the performance of the application to obtain a first performance analysis, and the computer program comprises:
    code for analyzing the application for a second period after binding the application to the selected processor to obtain a second performance analysis;
    code for comparing the first performance analysis with the second performance analysis; and
    code for undoing the binding such that the application is executed by the processor that executed the application before the binding if the comparison shows the performance has degraded.

13. A hardware system programmed for implementing the method as claimed in claim 1.

\* \* \* \* \*